United States Patent [19]
Fricke

[11] 3,983,511
[45] Sept. 28, 1976

[54] NORMAL INCIDENCE FACE PUMPED DISC LASER

[75] Inventor: William C. Fricke, Arlington, Va.

[73] Assignee: Sanders Associates, Inc., Nashua, N.H.

[22] Filed: Sept. 8, 1975

[21] Appl. No.: 610,969

[52] U.S. Cl. .................... 331/94.5 P; 331/94.5 E
[51] Int. Cl.$^2$ ......................................... H01S 3/06
[58] Field of Search ................ 331/94.5; 330/4.3

[56] References Cited
UNITED STATES PATENTS 3,679,996  7/1972  Almasi et al. .................. 331/94.5

*Primary Examiner*—William L. Sikes
*Attorney, Agent, or Firm*—Louis Etlinger; Richard I. Seligman

[57] ABSTRACT

A laser comprising a plurality of laser discs disposed normal to the laser beam propagation path within a cavity and including prisms between the laser discs to redirect the pump light onto the faces of the laser discs.

6 Claims, 9 Drawing Figures

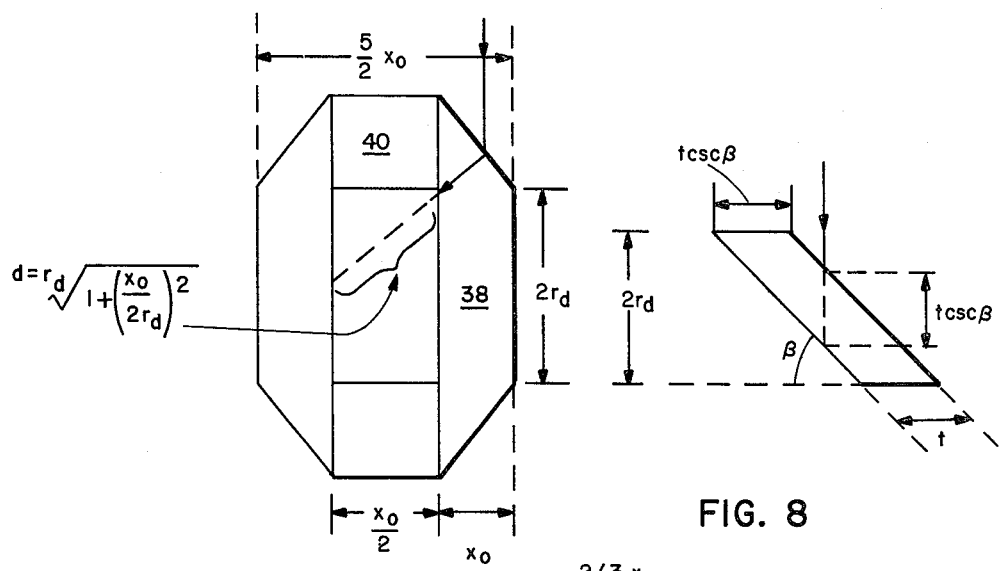
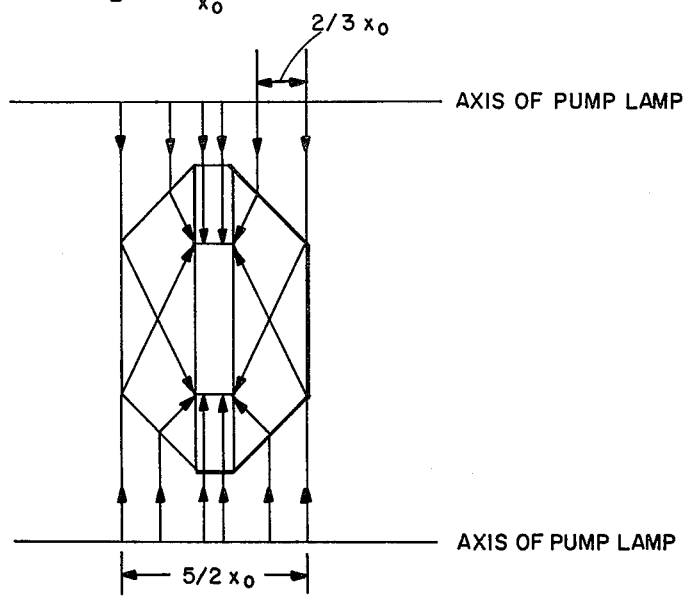
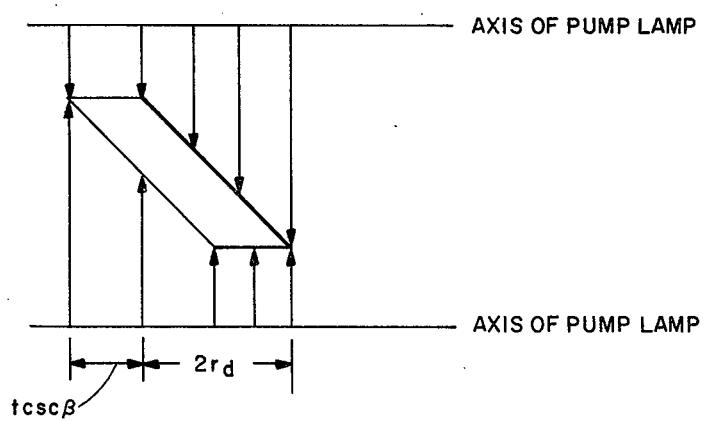
FIG. 9

NORMAL INCIDENCE FACE PUMPED DISC LASER

BACKGROUND OF THE INVENTION

This invention relates to disc lasers and more particularly to face pumped disc lasers.

A laser is a device consisting of a rod of laser material between parallel end mirrors, one of which provides full reflection and the other partial reflection and partial transmission of radiation therethrough. Pump light is introduced into the laser material and laser energy is produced in the laser rod by photonic emission from high energy level ions in the laser material. Pump light increases the number of ions from a lower energy level to an upper energy level. Pump light energy depletes the lower level population of ions creating an inversion of energy states and some of the ions in the upper energy undergo a spontaneous light emissive transmission to the lower level and a portion of the spontaneously emissive light reflects back and forth between the mirrored surfaces stimulating similar light emissive transmissions from other upper level ions. The stimulated emissions which reflect back and forth through the rod generates highly intensive laser light energy which is emitted through the partially reflective mirror.

One of the problems associated with the production of a laser beam is that the pumping light produces heat in the laser material as does operation at high repetition rates and thus, means often must be provided for removing excess heat. Excessive heat can reduce efficiency, produce an undesirable lens effect in the rod or cause fracture of the rod. One method proposed to solve this excessive heat problem was to segment the laser rod into a number of discs. By doing this the minimum dimension of each disc can be made small enough to eliminate thermal fracture. Also, it is possible to pass a cooling fluid past each of the discs to reduce the heating thereof.

However, more segmenting of the rod into thin discs presents certain problems. First of all, the pumping energy is applied to the edge of the discs rather than the faces thereof and therefore large cylindrical stresses are induced in the discs and these are relatively complex to compensate. Also, edge pumped discs are very inefficient.

In order to improve the efficiency of disc lasers it has been proposed to incline the discs at an angle with respect to the laser beam and insert prisms between the discs such that pump light is allowed to fall directly on the faces of the discs. However, this method establishes a preferred polarization direction in the laser cavity. Also, when uniaxial or biaxial laser crystals are employed as the laser medium, the crystalline axes must be properly orientated with respect to the Brewster angle or otherwise high loses due to birefringence would be produced. Furthermore, the faces of the prisms through which the laser beam passes are not normal to the laser beam and therefore extreme care must be taken in fabricating these prisms (e.g., costly high quality polishing) to ensure that the prisms will not cause dispersion of the laser beam.

SUMMARY OF THE INVENTION

Accordingly, it is an object of this invention to provide an improved laser.

It is another object of this invention to provide an improved disc laser.

It is a further object of this invention to provide an efficient disc laser with means for face pumping the discs without polarizing the laser cavity or causing dispersion of the laser beam.

Briefly, a disc laser is provided comprising at least one disc of laser material disposed within a cavity normal to the laser beam and a prism also disposed in the cavity adjacent the disc for deflecting pump light onto the face of the laser disc. Since the discs are face pumped, efficient operation is achieved and since they are normal to the laser beam, no polarization of the laser cavity occurs. The faces of those portions of the prisms within the cavity are also normal to the laser beam (parallel to the laser discs) and, therefore, do not present any serious laser beam dispersion problems.

BRIEF DESCRIPTION OF THE DRAWINGS

The above-mentioned and other features and objects of this invention will become more apparent by reference to the following description taken in conjunction with the accompanying drawings, in which:

FIG. 8 are illustrations of a novel and piror art laser disc illustration pumping efficiency rates; and FIG. 9 are illustrations of a novel and prior art disc and their projections onto a pump lamp.

DESCRIPTION OF PREFERRED EMBODIMENT

Figure 1:
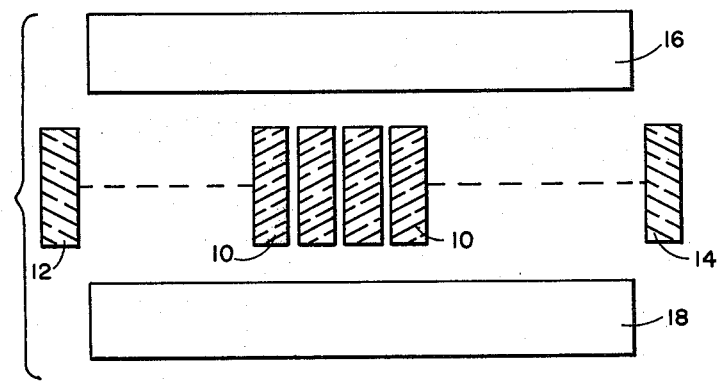
FIG. 1 is an illustration of a conventional edge pumped disc laser.

Referring now to FIG. 1, there is illustrated thereby a conventional disc laser comprising a plurality of laser discs 10 disposed within a laser cavity defined by a pair of mirrors 12 and 14. One of mirrors 12 or 14 is substantially totally reflective while one is partially reflective at laser emission wavelengths as is conventional. Pumping energy is supplied by a pair of flashlamps 16 and 18. The problems with this type of disc laser is that the discs 10 are edged pumped thereby inducing large cylindrical stresses in the discs. Compensation for this induced stress is difficult to provide. Also, because of the edge pumping, the laser is relatively inefficient.

Figure 2:
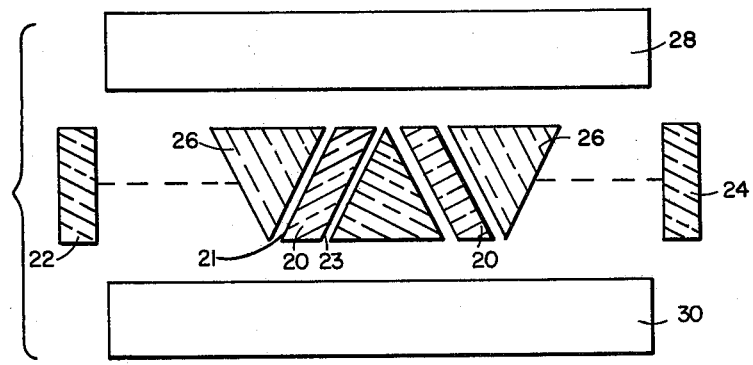
FIG. 2 is a conventional disc laser wherein the laser discs are inclined at an angle with respect to the laser beam and prisms are provided to pump excitation light onto the face of the discs.

In order to alleviate some of the problems of the disc laser of FIG. 1, the disc laser of FIG. 2 has been proposed. The disc laser of FIG. 2 comprises a plurality of inclined (generally at the Brewster angle) laser discs 20 arranged in zig-zag fashion in a cavity defined by a pair of mirrors 22 and 24. A plurality of prisms 26 are arranged between the discs 20 and pump light for the laser is provided by a pair of flashlamps 28 and 30. Some of the problems associated with the disc laser of FIG. 1 are cured by the laser of FIG. 2 in that the prisms 26 permit the pump light to fall directly on the faces of the discs 20. The principle disadvantage to this type of laser is that a preferred polarization direction is established in the laser cavity. Also, with this type laser, when uniaxial or biaxial laser crystals are employed as the discs 20 the crystalline axes of the discs must be aligned properly at the Brewster angle otherwise high losses due to bire-fringence will be produced. Furthermore, the faces 21 and 23 of the prisms 20 are not normal to the laser beam thus potential laser beam dispersion problems can exist and careful, expensive fabrication of these prism is required.

Figure 3:
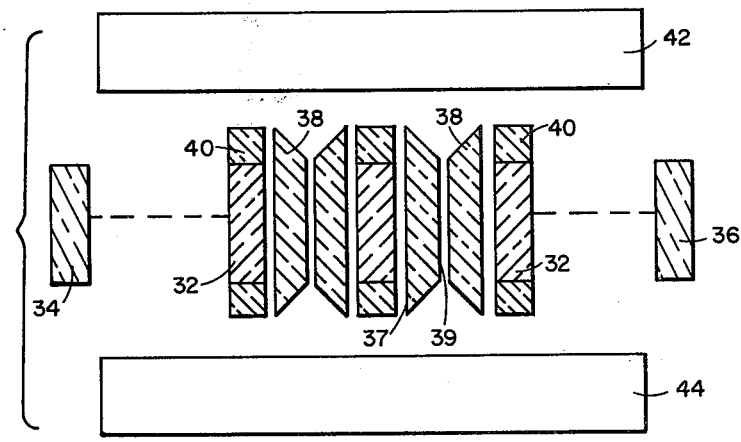
FIG. 3 is an illustration of a disc laser configured according to the invention.

A preferred embodiment of the invention is illustrated in FIG. 3. This embodiment does not have the problems discussed above with respect to the embodiments of FIG. 1 and FIG. 2. This disc laser comprises a plurality of laser discs 32 disposed within a laser cavity defined by mirrors 34 and 36. Typical disc materials are Ho:YLF, Nd:YAG and Nd:glass, however these are representative only and any solid laser materials may be used. Arranged between the discs are a plurality of prisms 38. Surfaces 37 and 39 of prisms 38 which are bounded by laser discs 32 are normal to the path of the laser beam and thus high quality prisms are not required since laser beam dispersion problems are minimized. The discs 32 are arranged within spacers or disc holders 40. Pumping light is supplied from a pair of flash lamps 42 and 44. Although two flash lamps are shown, it is within the scope of this invention to provide a single flash lamp or more than two flash lamps. Also, the number of laser discs 32 can be varied depending upon the application, and the invention only contemplates that at least one such disc 32 be used. No means are shown for encompassing the discs prisms, lamps and the like as these are well known in the art and no invention lies therein. For example, the disc holders and prisms may be placed in a tray with spaces between their surfaces.

This embodiment of FIG. 3 has many advantages over those of the prior art shown in FIGS. 1 and 2. Clearly, the fact that the discs are face pumped makes the laser much more efficient than that of FIG. 1 where the discs are edge pumped. This embodiment has many advantages of that over FIG. 2. For one, the discs are arranged perpendicular to the laser beam and, therefore, many more discs (laser material) can be disposed within a predetermined volume. Also, since the discs are perpendicular to the laser radiation, the cavity is not polarized; the disc faces are not at the Brewster angle.

Since the discs are face pumped, the spacers do not have to be transparent but preferably they are so such that pump light will also fall on the edges of the discs.

In disc lasers uniform pumping is essential for low beam distortion and therefore face pumping as described in FIG. 3 is the only means for achieving uniform illumination.

The following discussion is directed to the means for maximizing the efficiency of the laser of FIG. 3.

In the calculations which follow it is assumed that all the rays leave the pump lamp normal to its axis. This assumption is not, of course, a true model of real pump lamps. It does allow considerable simplification of the calculations and does permit most of the pump rays to be accounted for. In act, more than 80% of the rays leaving the lamp will, indeed, strike the disc.

Figure 4:
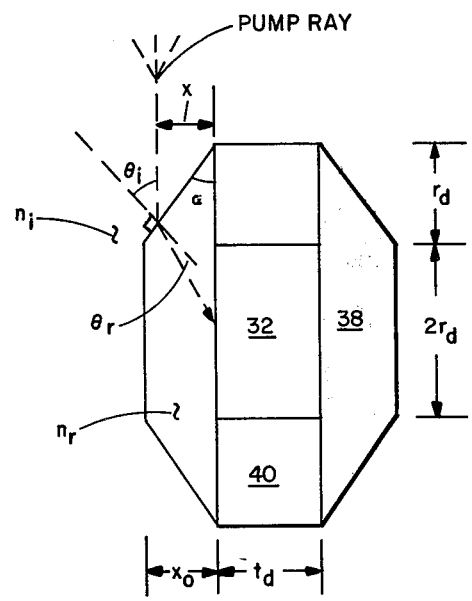
FIG. 4 is an illustration of the dimensioned laser disc and prisms of FIG. 3.

The pumping efficiency of such a configuration is a complicated function of the prism angle, $\alpha$, disc thickness, $t_d$, prism thickness, $x_o$, and so forth. An approximate numerical solution, however, can be obtained graphically. For the calculations below it is assumed that the disc holder is four disc radii wide as is indicated in FIG. 4.

The efficiency is defined as $$E = 2x + t_d/2x_0 + t_d$$

where $x$ is the position of the ray which, because of refraction, just grazes the center of the disc; and $x_o$ is the thickness of the prism.

Figure 5:
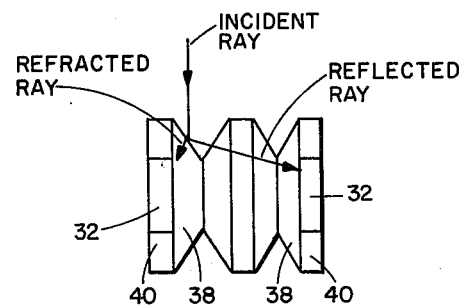
FIG. 5 is an illustration of the manner in which pump lamp rays are incident on the discs of FIG. 3.

Reflected rays will not be lost and will strike another disc in the assembly (see FIG. 5).

This definition of the efficiency merely assures that every ray which leaves the lamp will strike the disc, at least for the two dimensional lamp model used.

The prism thickness, $x_o$, is obtained from $$x_o = r_d \tan \alpha,$$

the ray position, $x$, from $$x = 3r_d \tan (90° - \theta_r - \alpha)/1 + \tan (90° - \theta_r - \alpha)$$

The refracted ray angle, $\theta_r$, is obtained from Snell's law:

$$\sin \theta_r = n_i/n_r \sin \theta_i = n_i/n_r \cos \alpha.$$

It is easy to see that very large prism angles (90°) will result in low efficiencies. Very small angles, on the other hand, will not result in uniform illumination of the surface of the disc. The minimum prism thickness for maximum efficiency occurs (see FIG. 4) when $$x_o = r_d \tan \alpha = \frac{3r_d \cot (\theta_r + \alpha)}{1 + \cot (\theta_r + \alpha)}$$

Figure 6:
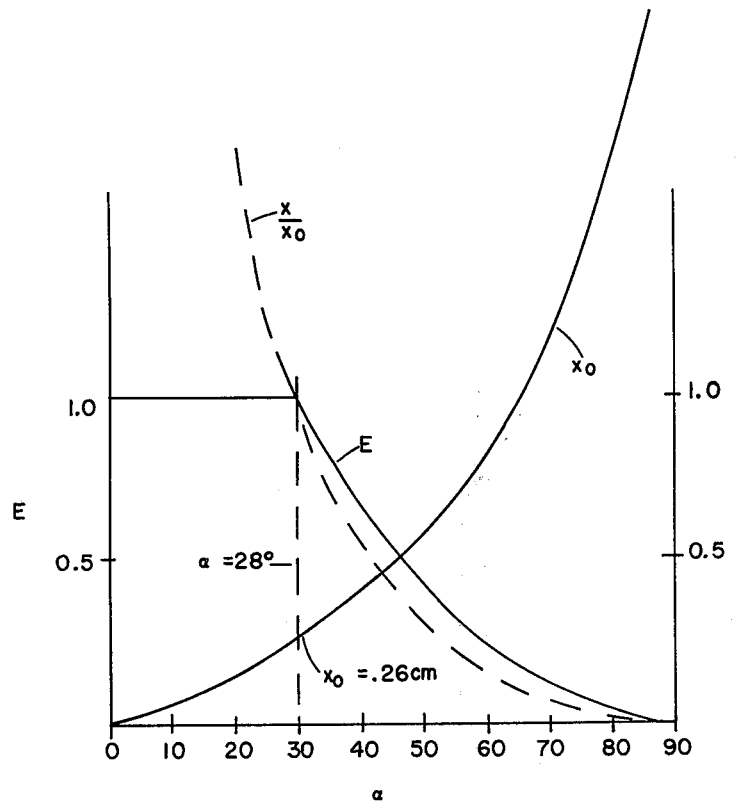
FIG. 6 is a graphical illustration of the efficiency of the laser of FIG. 3.

This trancendental equation yields a minimum value for $\alpha$ since $\alpha$ is related to $\theta_r$ by Snell's law. FIG. 6 is a plot of the efficiency as a function of the prism angle $\alpha$. The angle where $E = 1$ is the optimum prism angle and is $$\alpha_{opt} = 28°$$

corresponding to a prism thickness of $$x_o = 0.26 \text{ cm}.$$

Figure 7:
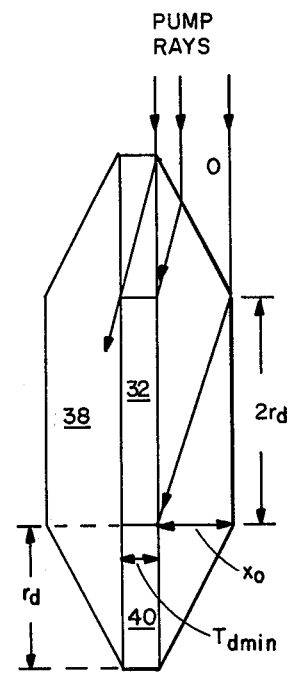
FIG. 7 is an illustration of the laser disc and prisms of FIG. 3 showing desired pump lamp rays incident on the disc.

The pumping rate (watts /cm³) has a maximum value when the disc thickness is half the prism thickness. This maximum occurs when the pump rays incident on the apex of the prism just graze the opposite edge of the disc. This minimum thickness can be found from the two similar triangles (FIG. 7).

$$(2r_d)/x_o = (r_d)/t_{d,min}$$

and so $$t_{dmin} = (x_o/2).$$

The pumping rate inside the discs for the laser of FIG. 3 is about twice that of the laser of FIG. 2 for equivalent disc thicknesses. the equivalent disc thickenss is that which corresponds to equal distances traveled by the pump light inside the disc and accounts for the fact that the pump light is propagating at an angle to the disc surface. From FIG. 8 it is seen that the distance the pump light travels through the disc for the laser of FIG. 3 is $$d_N = r_d \sqrt{1 + \left(\frac{x_o^2}{2r_d}\right)}$$

while for the laser of FIG. 2 it is, $$d_Z = t_z \csc \beta,$$

Thus, when $d$ (FIG. 3 laser) = $d$ (FIG. 2 laser) the thickness of the laser disc of FIG. 2 is $$t_z = r_d \sqrt{1 + \left(\frac{x_o^2}{2r_d}\right)}.$$

The power density inside the disc is defined by
$U_{FIG. 3}$ laser, FIG. 2 laser = projected length of disc-/volume of disc where it is assumed that the total pump power incident as the disc is proportional to the length of the projection of the disc onto the lamp (see FIG. 9). For the laser of FIG. 3 the projected length of the lamp is $$\left[(2) \times \left(2 x_o + \frac{x_o}{2}\right)\right]$$

while for the laser of FIG. 2 it is $[(2) \times (2r_d + t_z)\csc\beta]$. The additional factor of 2 accounts for the fact that there are two lamps.

The volume of the discs are:
$V = (\pi r_d^2)(x_o/2)$ for the laser of FIG. 3.
$V = \pi t_z r_d^2 \csc \beta$ for the laser of FIG. 2

Thus,
$U = 5/\pi r_d^2$ for the laser of FIG. 3
and $$U = \frac{2_d r}{\pi t_z r_d^2 \csc\beta} = \frac{2 \cos\beta}{\pi r_d^2} = \frac{1.41}{\pi r_d^2} \text{ for the laser of FIG. 2.}$$

Therefore,

U (FIG. 3)/U (FIG. 2) = 5/1.41 = 3.55

Expressions for the fraction of the laser cavity occupied by laser material are found for both laser systems below (See FIG. 8).
This fraction for the laser of FIG. 1 is $$f = \frac{\pi r_d^2 \left(\frac{X_o}{2}\right)}{\pi r_d^2 \left(\frac{5X_o}{2}\right)} = 1/5$$

while for laser of FIG. 2

$$f = \frac{\pi r_d^2 (\csc\beta) t_z}{2r_d + t_z \csc\beta},$$

$$f = \frac{\pi r_d^2 \sqrt{1 + \left(\frac{x_o}{2r_d}\right)^2}}{2 + \sqrt{1 + \left(\frac{x_o}{2r_d}\right)^2}}$$

Consequently,
$f$ (FIG. 3)/$f$ (FIG. 2) = 3/5

The total pumping rate per unit length for each system is proportional to $fU_{(FIG. 3)}$ of $fU_{(FIG. 2)}$. Thus, the ratio of total pumping rates per unit length is $$\rho = \frac{fU_{(FIG. 3)}}{fU_{(FIG. 2)}}$$

$$\rho = (3.55)(0.6)$$

$$\rho = 2.13$$

The illustrated design for the laser of FIG. 3 will, therefore, result in a much higher total pumping rate than is possible with the laser of FIG. 2. As a consequence, higher output powers per unit volume are feasible.

While I have described above the principles of my invention in connection with specific apparatus it is to be clearly understood that this description is nade only by way of example and not as a limitation of the scope of my invention as set forth in the accompanying claims.

I claim
1. A laser device, comprising:
a laser cavity;
at least one disc of active laser medium arranged normal to the axis of laser radiation;
pumping means for emitting radiation of pumping wavelengths; and
means for refracting said pumping radiation onto at least one face of said laser disc.
2. A laser device as defined in claim 1 wherein said means for refracting said pumping radiation includes a prism disposed adjacent a face of said laser disc.
3. A laser device as defined in claim 2, further including a plurality of laser discs arranged normal to the axis of laser radiation and a plurality of prisms arranged either side of each of said laser discs for refracting pumping radiation onto the faces of said laser discs.
4. A laser device as defined in claim 3 wherein the surfaces of said prism bounded by said laser disc are normal to the axis of laser radiation.
5. A laser device as defined in claim 4 wherein said pumping means includes a flash lamp.
6. A laser device as defined in claim 4 wherein said pumping means includes a pair of flashlamps.

* * * * *